United States Patent [19]

Bryan et al.

[11] Patent Number: 4,983,847

[45] Date of Patent: Jan. 8, 1991

[54] X-RAY INTENSIFYING SCREEN INCLUDING A TITANIUM ACTIVATED HAFNIUM DIOXIDE PHOSPHOR CONTAINING INDIUM

[75] Inventors: Philip S. Bryan, Webster; Patrick M. Lambert; Christine M. Towers, both of Rochester; Gregory S. Jarrold, Henrietta, all of N.Y.

[73] Assignee: Eastman Kodak Company, Rochester, N.Y.

[21] Appl. No.: 437,866

[22] Filed: Nov. 16, 1989

[51] Int. Cl.$^5$ .............................................. C09K 11/67
[52] U.S. Cl. .......................... 250/483.1; 252/301.4 F; 428/690
[58] Field of Search .............. 252/301.4 F; 250/483.1; 428/690

[56] References Cited

U.S. PATENT DOCUMENTS

| | | | |
|---|---|---|---|
| 2,314,699 | 3/1943 | Hale | 252/301.4 |
| 2,402,760 | 6/1946 | Leverenz | 252/301.4 |
| 2,542,336 | 2/1951 | Kröger | 252/301.4 |
| 3,640,887 | 2/1972 | Anderson | 252/301.4 |
| 3,905,912 | 9/1975 | Mathers | 252/301.4 |
| 3,974,389 | 8/1976 | Ferri et al. | 250/483.1 |
| 4,006,097 | 2/1977 | Kelsey, Jr. | 252/301.4 |
| 4,014,812 | 3/1977 | Kelsey et al. | 252/301.4 F |
| 4,068,128 | 1/1978 | Chenot et al. | 252/301.4 |
| 4,070,583 | 1/1978 | Rabatin | 250/483.1 |
| 4,112,194 | 9/1978 | Chenot et al. | 252/301.4 |
| 4,153,469 | 5/1979 | Alexandrov et al. | 252/301.4 |
| 4,275,333 | 6/1981 | Kagami et al. | 252/301.6 |
| 4,295,989 | 10/1981 | Klein et al. | 252/301.4 |
| 4,795,589 | 1/1989 | Mikami et al. | 252/301.6 |

FOREIGN PATENT DOCUMENTS 38-22263  10/1963  Japan ............................ 252/301.4 F
53-58491  5/1978  Japan ............................ 252/301.4 F

OTHER PUBLICATIONS

McCauley et al. "J. of Lumin," 6, (1973), pp. 105-115.
E. Iwase and S. Nishiyama, "Luminescence Spectra of Trivalent Rare Earth Ions", *Proc. Intern. Sym. Mol. Struct. Spectry.*, Tokyo, 1962, A-407-1 to 7.
L. H. Brixner, "Structural and Luminescent Properties of the Ln$_2$Hf$_2$O$_7$-type Rare Earth Hafnates", *Mat. Res. Bull.*, vol. 19, pp. 143-149, 1984.
J. F. Sarver, "Preparation and Luminescent Properties of Ti-activated Zirconia", *Journal of the Electrochemical Society*, vol. 113, No. 2, Feb. 1966, pp. 124-128.
RPA-1 Bryan et al U.S. Ser. No. 305,222, filed Feb. 3, 1989, titled X-Ray Intensifying Screen, Phosphor Composition, and Process of Phosphor Preparation.
RPA-2 Bryan et al. U.S. Ser. No. 305,310 filed Feb. 3, 1989, now abandoned in favor of U.S. Ser. No. 393,602, filed Aug. 14, 1989, titled Phosphor Composition and X-ray Intensifying Screen.
RPA-3 Bryan et al. U.S. Ser. No. 437464, filed concurrently herewith, each titled X-Ray Intensifying Screen and Phosphor Composition.

*Primary Examiner*—Jack Cooper
*Attorney, Agent, or Firm*—Carl O. Thomas

[57] ABSTRACT

An intensifying screen is disclosed containing a phosphor composition comprised of monoclinic crystals of a titanium activated hafnia phosphor host containing indium ions or indium ions in combination with neodymium ions. Indium increases speed while reducing afterglow while the further addition of neodymium allows afterglow to be eliminated. A phosphor composition in which zirconia is at least partially substituted for hafnia is also disclosed.

12 Claims, No Drawings

X-RAY INTENSIFYING SCREEN INCLUDING A TITANIUM ACTIVATED HAFNIUM DIOXIDE PHOSPHOR CONTAINING INDIUM

FIELD OF THE INVENTION

The invention relates to novel X-ray intensifying screens. More specifically, the invention relates to fluorescent screens of the type used to absorb an image pattern of X-radiation and to emit a corresponding pattern of longer wavelength electromagnetic radiation. The invention additionally relates to certain novel phosphor compositions and to processes for their preparation.

BACKGROUND OF THE INVENTION

A developable latent image is formed in a silver halide emulsion layer of a radiographic element when it is imagewise exposed to X-radiation. Silver halide emulsions, however, more efficiently absorb and consequently are more responsive to longer (300 to 1500 nm) wavelength electromagnetic radiation than to X-radiation. Silver halide possesses native sensitivity to both the near ultraviolet and blue regions of the spectrum and can be sensitized readily to the green, red, and infrared portions of the electromagnetic spectrum.

Consequently it is an accepted practice to employ intensifying screens in combination with silver halide radiographic elements. An intensifying screen contains on a support a phosphor layer that absorbs the X-radiation more efficiently than silver halide and emits to the adjacent silver halide emulsion layer of the radiographic element longer wavelength electromagnetic radiation in an image pattern corresponding to that of the X-radiation received.

The most common arrangement for X-radiation exposure is to employ a dual coated radiographic element (an element with silver halide emulsion layers on opposite sides of a support), each emulsion layer being mounted adjacent a separate intensifying screen. The radiographic element is a consumable, used to record a single imagewise exposure, while the intensifying screens are used repeatedly.

If the luminescence of an intensifying screen persists after imagewise exposure to X-radiation has been terminated, there is a risk that the afterglow will expose the next radiographic element brought into contact with the screen. Thus, the measure of a satisfactory intensifying screen is not only the intensity of the luminescence it exhibits upon exposure to X-radiation, but also the rapidity with which the luminescence decays upon the termination of X-radiation exposure.

Of the many different phosphor compositions known, most have failed to satisfy the practical demands of intensifying screen application for failing to generate sufficient emission intensity upon exposure to X-radiation, for exhibiting persistent luminescence after exposure (afterglow), or a combination of both.

Phosphors employed in intensifying screens consist of a host compound, often combined with a small amount of another element that changes the hue and/or improves the efficiency of fluorescence. It has been recognized that useful phosphors are those in which the host compound contains at least one higher atomic number element to facilitate absorption of the high energy X-radiation. For example, barium sulfate, lanthanide oxyhalides and oxysulfides, yttrium tantalate, and calcium tungstate, are widely employed phosphor host compounds.

From time to time various compounds of zirconium and hafnium have been investigated as phosphors. Zirconium and hafnium are known to be atoms of essentially similar radii, 1.454 Å and 1.442 Å, respectively. Practically all known compounds of zirconium and hafnium correspond to the +4 oxidation state. The chemical properties of the two elements are essentially identical.

Hale U.S. Pat. No. 2,314,699, issued Mar. 23, 1943, discloses a method of preparing a luminescent material which comprises dispersing an oxide of an element chosen from the group consisting of beryllium, magnesium, zinc, and zirconium in a solution of a salt of an element chosen from the group consisting of silicon, germanium, titanium, zirconium, hafnium, and thorium, and precipitating the dioxide of the element of the second named group upon the oxide of the element of first named group.

Leverenz U.S. Pat. No. 2,402,760, issued June 25, 1946, discloses a crystalline luminescent material represented by the general formula:

$$u(BeO)v(XO_2)w(YO_2):xMn$$

where X is a metal selected from the group of metals consisting of zirconium, titanium, hafnium, and thorium, Y is an element selected from the group of elements consisting of silicon and germanium, the molar ratio $$u/v$$

being from 1/99 to 99, the molar ratio of

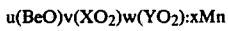

being from ⅓ to 2, and the sum of u+v being equal to one gram molecular weight.

Zirconium and hafnium containing compounds also containing rare earth elements have also been disclosed from time to time:

Anderson U.S. Pat. No. 3,640,887, issued Feb. 8, 1972, discloses transparent polycrystalline ceramic bodies composed of oxides of thorium, zirconium, hafnium, and mixtures thereof with oxides of the rare earth elements 58 through 71 of the Periodic Table optionally additionally including yttria. Anderson contains no mention of luminescence.

Mathers U.S. Pat. No. 3,905,912, issued Sept. 16, 1975, discloses a hafnium phosphate host phosphor with an activator selected from among terbium, praseodymium, dysprosium, thulium, and europium.

Kelsey, Jr. U.S. Pat. No. 4,006,097, issued Feb. 1, 1977, discloses ytterbium activated hafnia phosphors.

Chenot et al U.S. Pat. No. 4,068,128, issued Jan. 10, 1978, discloses as a phosphor for luminescent intensifying screens $(Hf_{1-x}Zr_x)O_2:P_2O_5$, where x is in the range of from 0 to 0.5. $Eu^{+2}$ is disclosed to enhance blue emission.

Chenot et al U.S. Pat. No. 4,112,194, issued Sept. 5, 1978, discloses as a phosphor for luminescent intensifying screens $(Hf_{1-x}Zr_x)_{3-y}A_{4y}(PO_4)_4$, where x is within the range of about 0.005 to 0.5, A is selected from the group consisting of lithium, sodium, and potassium, and y is within the range of 0.4 to 2.0. $Eu^{+2}$ is disclosed as an activator for a green emitting phosphor.

Alexandrov et al U.S. Pat. No. 4,153,469, issued May 8, 1979, discloses as artificial precious stones or laser elements monocrystals of zirconium or hafnium oxide stabilized with yttrium oxide.

Klein et al U.S. Pat. No. 4,295,989, issued Oct. 20, 1981, discloses a cubic yttria stabilized hafnia phosphor doped with $Ce^{3+}$.

E. Iwase and S. Nishiyama, "Luminescence Spectra of Trivalent Rare Earth Ions", *Proc. Intern. Sym. Mol. Struct. Spectry.*, Tokyo, 1962, A-407-1 to 7, report the crystal lattice constants of monoclinic hafnia and zirconia as follows:

TABLE I

| Oxide | a-axis | b-axis | c-axis | β |
|-------|--------|--------|--------|------|
| $HfO_2$ | 5.11 | 5.14 | 5.28 | 99° 44' |
| $ZrO_2$ | 5.21 | 5.26 | 5.375 | 99° 55' |

Iwase and Nishiyama investigated hafnia and zirconia for cathodoluminescence—i.e., fluorescence response to electron bombardment. The emission characteristics of these oxides doped with trivalent samarium, praseodymium, dysprosium, terbium, and europium ions are reported.

It has been recognized that the inclusion of titanium as an activator can significantly increase the luminescence of zirconia and hafnia:

Kröger U.S. Pat. No. 2,542,336, issued Feb. 20, 1951, discloses a phosphor containing titanium as an activator and having a matrix composed of one or more of the oxides of zirconium, hafnium, thorium, germanium or tin, to which may be added either acid oxides or basic oxides or both.

L. H. Brixner, "Structural and Luminescent Properties of the $Ln_2Hf_2O_7$-type Rare Earth Hafnates", Mat. Res. Bull., Vol. 19, pp. 143–149, 1984, describes investigations of title phosphor host compounds. Ln is defined to include not only lanthanides, but also scandium and yttrium. After reporting the properties of $Ti^{+4}$ as an activator for rare earth hafnates, Brixner states:

> We also looked at this same activator in pure $HfO_2$. Under 30 kVp Mo radiation x-ray excitation, this composition also emits in a broad band centered around 477 nm as seen in FIG. 5. This emission has an intensity of about 1.6 times that of PAR $CaWO_4$ and could therefore be of interest as an x-ray intensifying screen phosphor, especially in light of the superior absorption of HfO relative to CaWO as seen in FIG. 6. Unfortunately, the price of optical grade HfO is so prohibitive that it cannot be used in screen applications/ . (Emphasis added.)

J. F. Sarver, "Preparation and Luminescent Properties of Ti-Activated Zirconia", *Journal of the Electrochemical Society*, Vol. 113, No. 2, Feb. 1966, pp. 124–128, discloses investigations of $Ti^{+4}$ activation of zirconia. Sarver states:

> At room temperature the phosphor exhibits a very rapid initial exponential decay . . . similar to $CaWO_4$ and $MgWO_4$ and some sulfide phosphors . . . Beyond about 20 μsec, the decay rate becomes much slower and the phosphorescence is visually detectable for a few minutes. It was found that the addition of certain mineralizers or fluxes, in particular 1 mole % LiF, besides leading to an expected increase in particle size during firing, also causes an increase in the intensity of the phosphorescence although the intensity of the fluorescence is virtually the same . . .

Kagami et al U.S. Pat. No. 4,275,333 discloses a composition of indium oxide and a blue, green, or red emitting phosphor.

Mikami et al U.S. Pat. No. 4,795,589 discloses a zinc silicate phosphor containing indium.

RELATED PATENT APPLICATIONS

1. RPA-1

Bryan et al U.S. Ser. No. 305,222, filed Feb. 3, 1989, titled X-RAY INTENSIFYING SCREEN, PHOSPHOR COMPOSITION, AND PROCESS OF PHOSPHOR PREPARATION, commonly assigned, discloses X-ray intensifying screens containing a hafnia phosphor host containing zirconia in concentrations higher than those found in optical grade hafnia. The phosphor can include as an activator one or a combination of titanium, rare earth, and alkali metal ions.

2. RPA-2

Bryan et al U.S. Ser. No. 305,310, filed Feb. 2, 1989, now abandoned in favor of U.S. Ser. No. 393,602, filed Aug. 14, 1989, commonly assigned, titled PHOSPHOR COMPOSITION AND X-RAY INTENSIFYING SCREEN, discloses the preparation of lithium hafnate phosphors. The phosphor crystals are disclosed to consist essentially of oxygen and a combination of metals satisfying the relationship:

$$Li_2Hf_{1-x-y-z}Zr_zSn_yTi_xL_w$$

where

L is a rare earth, where "rare earth" is therein defined to include lanthanides, yttrium, and scandium;

w+x+y are together 0 to 0.2; and z is up to 0.2.

RPA-3

Bryan et al U.S. Ser. No. 437,464, filed concurrently herewith and commonly assigned, titled X-RAY INTENSIFYING SCREEN AND PHOSPHOR COMPOSITION, discloses titanium activated zirconium oxide and hafnium oxide phosphors containing neodymium to reduce afterglow.

SUMMARY OF THE INVENTION

In one aspect, this invention is directed to a screen comprised of a support and a fluorescent layer containing a phosphor capable of absorbing X-radiation and emitting longer wavelength electromagnetic radiation comprised of monoclinic crystals of a titanium activated hafnia phosphor host. The intensifying screen is characterized in that indium is present in the monoclinic crystals in an amount sufficient to reduce afterglow.

In another aspect this invention is directed to monoclinic crystals of a phosphor host consisting essentially of at least one of zirconia and hafnia containing an amount of titanium ions sufficient to increase luminescence intensity during exposure to stimulating radiation and an amount of indium ions sufficient to reduce the intensity of luminescence persisting after exposure to stimulating radiation.

DESCRIPTION OF PREFERRED EMBODIMENTS

An essential and novel feature of the present invention is the discovery that the addition of indium ions to a phosphor host consisting essentially of at least one of zirconia and hafnia containing an amount of titanium ions sufficient to increase luminescence intensity during exposure to stimulating radiation both increases the intensity of prompt emission and reduces the disadvantage of phosphorescence (alternatively referred to as persistent luminescence or afterglow) associated with titania activated zirconia and hafnia phosphors. By reducing afterglow the invention makes titanium activated zirconia and hafnia phosphors available for applications requiring prompt decay of emission upon the cessation of external stimulation.

In a specifically preferred form of the invention both indium and neodymium are incorporated into the titanium activated host phosphor. If neodymium is employed in the absence of indium, the specific subject matter of RPA-3, afterglow can be eliminated, but at the price of a reduction in prompt emission. By employing indium in combination with neodymium afterglow can be entirely eliminated with indium compensating to maintain prompt emission at or above the levels observed without neodymium inclusion. Thus, in combination indium and neodymium can eliminate afterglow while maintaining or exceeding the prompt emission capabilities of the titanium activated phosphor host exhibited in their absence.

Any form of radiation can be employed known to stimulate zirconia or hafnia phosphors—e.g., X-radiation, ultraviolet radiation, or cathode rays. Since the more energetic forms of radiation require a higher atomic mass for efficient absorption, it is specifically preferred to employ a hafnia phosphor host when X-radiation is employed for stimulation.

In a specific, preferred form the invention is directed to an intensifying screen comprised of a support and a fluorescent layer containing a phosphor capable of absorbing X-radiation and emitting longer wavelength electromagnetic radiation comprised of monoclinic crystals of a titanium activated hafnia phosphor host. Indium or indium in combination with neodymium provide the afterglow control and desirable prompt emission qualities described above, making it possible to employ a titanium activated hafnia phosphor host in an X-ray intensifying screen intended to expose silver halide radiographic elements in rapid succession. By reducing or eliminating afterglow the risk that a radiographic element mounted adjacent the X-ray intensifying screen will receive an imagewise exposure from the screen attributable to emission persistence from a previous X-radiation exposure is avoided.

Since the chemical similarities of zirconium and hafnium atoms prevent their complete separation, it is appreciated that even the purest attainable forms of zirconia also contain at some residual hafnia and vice versa. The phosphor compositions of this invention are contemplated to include as a phosphor host the full range of possible zirconia to hafnia ratios.

The hafnia phosphor hosts contemplated for use in X-ray intensifying screens are contemplated to satisfy the relationship:

$$Hf_{1-z}Zr_z \quad (I)$$

where z is up to 0.3. Optical grade hafnia, the purest form of hafnia readily commercially attainable, contains less than about $3 \times 10^{-4}$ mole of zirconia per mole of hafnia. Contrary to what has heretofore suggested by the art, when the zirconia content of the hafnia phosphor host is increased above the levels found in optical grade hafnia an increase in luminescence is observed. Preferred phosphors are therefore those in which z is in the range of from $4 \times 10^{-4}$ to 0.3, most preferably from $1 \times 10^{-3}$ to 0.2, and optimally from $2 \times 10^{-3}$ to 0.1. The practical significance of this discovery is that reagent grade hafnia, commercially available with z being slightly less than $2 \times 10^{-2}$, can be employed as a hafnia phosphor host.

The small amounts of other elements found in commercially available reagent grade hafnium and zirconium source compounds are not detrimental to intensifying screen performance. Therefore, other possible impurities of the phosphor host need be given no further consideration.

In the simplest form of the invention monoclinic reagent grade hafnia or zirconia can be purchased and formed into a phosphor satisfying the requirements of this invention. To form monoclinic phosphor particles containing a selected ratio of hafnium and zirconium, commercially available sources of zirconium and hafnium are intimately intermixed, preferably by being dissolved in a common solvent, followed by coprecipitation. The hafnium and zirconium containing mixture is chosen so that upon firing only hafnium, zirconium, and oxygen atoms remain as residue, any other moieties of the compounds being thermally decomposed or otherwise driven off in firing.

Common sources of hafnium and zirconium include the dioxides, the basic carbonates, the oxychlorides, the oxynitrates, the sulfates, and the tetrachlorides. While the dioxides, the basic carbonates, and the sulfates can be used as purchased to produce phosphors, it is advantageous for both handling and phosphor performance to convert the other sources to less soluble solids that can be fired to give the monoclinic $DO_2$ phosphor desired, where D represents zirconium or hafnium. For example, treatment of aqueous hafnium and zirconium ion containing solutions with base (e.g., alkali or ammonium hydroxide) gives a precipitate which is a mixture of hydrous hafnia and hydrous zirconia, the relative proportions of which depend upon those present in the starting materials.

Other useful solids satisfying phosphor host requirements can be produced by treating hafnium and zirconium ion containing solutions with organic precipitating agents, since organic materials consisting of carbon, hydrogen, and optionally nitrogen and/or oxygen leave no objectionable residue upon thermal decomposition.

Hafnium and zirconium can be conveniently coprecipitated as carboxylates, such as those containing from about 2 to 20 carbon atoms. The carboxylate moieties are in one preferred form aliphatic carboxylates containing from about 2 to 10 carbon atoms, including both monocarboxylates and polycarboxylates—particularly dicarboxylates, such as oxalates, succinates, fumarates, etc. Aromatic carboxylates, such as benzoates, phthalates, and their ring substituted homologues, are also convenient to use. A particularly preferred class of carboxylates are α-hydroxycarboxylates containing from 2 to 10 carbon atoms, such as glycolates, lactates, and mandelates. Oxalic acid can be viewed as either a dicarboxylic acid or an α-hydroxycarboxylic acid. Oxalates are particularly preferred moieties for forming not only hafnium and zirconium compounds, but also compounds of other metals to be incorporated in forming preferred forms of the phosphor more particularly described below. The carboxylate moieties can form simple carboxylates with the hafnium or zirconium or can form hafnium or zirconium carboxylate complexes including additional cations, such as alkali metal or ammonium ions.

The hafnium and zirconium carboxylates can be conveniently formed by reacting in a common solvent the acid, salt, or ester of the carboxylate with hafnium and zirconium containing compounds in the ratios desired in the phosphor. The hafnium and zirconium containing compounds to be reacted can be selected from among compounds such as hafnium tetrachloride, zirconium tetrachloride, hafnium oxychloride, zirconium oxychloride, hafnium basic carbonate, zirconium basic carbonate, hafnium nitrate, zirconium nitrate, zirconium carbonate, hafnium sulfate, zirconium sulfate, and mixtures thereof.

It is also contemplated to employ hafnium and zirconium alkoxides as starting materials. Preferred hafnium and zirconium alkoxides are those which satisfy formula II:

$$D(OR)_4 \qquad (II)$$

where

D represents zirconium or hafnium and

R represents a hydrocarbon moiety containing from about 1 to 20 (preferably about 1 to 10) carbon atoms.

The hydrocarbon moieties can be chosen from any convenient straight or branched chain or cyclic saturated or unsaturated aliphatic hydrocarbon moiety—e.g., alkyl, cycloalkyl, alkenyl, or alkynyl. Alternatively the hydrocarbon moiety can be an aromatic moiety—e.g., benzyl, phenyl, tolyl, xylyl, naphthyl, etc. In a specifically preferred from R is in each instance lower alkyl of from 1 to 4 carbon atoms. Hafnium and zirconium alkoxides are disclosed in U.S. Pat. Nos. 3,297,414; 3,754,011; 4,525,468; and 4,670,472, the disclosures of which are here incorporated by reference.

In addition to alkoxide and carboxylate moiety containing hafnium and zirconium compounds various chelates, such as hafnium and zirconium $\beta$-diketones and diaminecarboxylates can be employed. Exemplary useful hafnium starting materials are set forth under heading III below. All the compounds have otherwise identical zirconium analogues. Further, although water of hydration has been omitted, it is to be understood that under normal ambient conditions most of the compounds exist as hydrates.

(III)
Exemplary Hafnium Starting Materials

| | | |
|---|---|---|
| H-1 | Hafnyl oxalate | $HfO(C_2O_4)$ |
| H-2 | Hafnyl oxalic acid | $H_2[HfO(C_2O_4)_2]$ |
| H-3 | Dioxalatohafnium | $Hf(C_2O_4)_2$ |
| H-4 | Trioxalatohafnic acid | $H_2[Hf(C_2O_4)_3]$ |
| H-5 | Ammonium trioxalatohafnate | $(NH_4)_2[Hf(C_2O_4)_3]$ |
| H-6 | Potassium tetraoxalatohafnate | $K_4[Hf(C_2O_4)_4]$ |
| H-7 | Sodium tetraoxalatohafnate | $Na_4[Hf(C_2O_4)_4]$ |
| H-8 | Ammonium hafnyl oxalate | |
| H-9 | Polyoxalatopolyhafnic acids | |
| H-10 | Potassium hafnyl tartrate | $K_2[HfO(C_4H_4O_6)_2]$ |
| H-11 | Tetramandelatohafnic acid | $H_4[Hf(O_2CCHOC_6H_5)_4]$ |
| H-12 | Triglycolatohafnic acid | $H_3HfOH(OCH_2COO)_3$ |
| H-13 | Trilactohafnic acid | $H_3HfOH(OCHCH_3COO)_3$ |
| H-14 | Trioxodihafnium stearate | $Hf_2O_3(O_2C(CH_2)_{16}CH_3)_2$ |
| H-15 | Trioxodihafnium 2-ethylcaproate | $Hf_2O_3(O_2CCHC_2H_5(CH_2)_3CH_3)_2$ |
| H-16 | Hafnium acetylacetonate | $Hf(C_5H_7O_2)_4$ |
| H-17 | Potassium bisnitrilotriacetohafnate | $K_2\{Hf[N(CH_2CO_2)_3]\}$ |
| H-18 | Hafnium ethylenediaminetetraacetic acid | $Hf[(O_2CCH_2)_2NCH_2]_2$ |
| H-19 | Hafnyl malonate | $HfO(O_2CCH_2CO_2)$ |
| H-20 | Hafnyl phthalate | $HfO(O_2C_6H_4CO_2)$ |
| H-21 | Hafnium tetraisopropoxide | $Hf(OC_3H_7)_4$ |
| H-22 | Hafnium tetra-t-amyloxide | $Hf(OC_5H_{11})_4$ |
| H-23 | Hafnium tetra(phenoxide) | $Hf(OC_6H_5)_4$ |
| H-24 | Hafnium di(isopropoxide) bis(2-ethoxyethoxide) | $Hf(OC_3H_7)_2(OC_2H_4OC_2H_5)_2$ |
| H-25 | Hafnium tetra(cyclohexoxide) | $Hf(OC_6H_{11})_4$ |
| H-26 | Hafnium di(isopropoxide) bis[2-(2-n-dodecanoxyethoxy)ethoxide] | $Hf(OC_3H_7)_2(OC_2H_4OC_2H_4OC_{12}H_{25})_2$ |

Formation of the monoclinic phosphor host is achieved by heating the zirconium and/or hafnium compounds to temperatures up to and including 1400° C. Higher firing temperatures can, of course, be undertaken, since the phosphor possesses high thermal stability. However, it is a distinct advantage of this invention that firing temperatures above 1400° C. are not required. Preferred firing temperatures are in the range of from about 900° to 1300° C.

Firing is continued until conversion to the monoclinic phase is achieved. For maximum firing temperatures the duration of firing can be less than 1 hour. While extended firing times are possible, once the phosphor has been converted to the monoclinic crystalline form, extending the duration of firing serves no useful purpose. Generally firing times in the range of from 1 to 10 hours, more typically 2 to 5 hours, provide full conversions of the starting materials to the phosphor composition sought.

Since the starting materials are in most instances decomposed at temperatures well below the 900° C. minimum temperature level contemplated for monoclinic crystal growth, it is generally convenient to heat the starting materials to a temperature above their decomposition temperature, but below 900° C., for an initial period to purge volatilizable materials before progressing to the higher crystallization temperatures. Typically, a preliminary heating step in the range of from about 300° to 900° C., preferably in the range of from 400° to 700° C., is undertaken.

It is also often convenient to divide firing into two or more consecutive steps with intermediate cooling to permit grinding and/or washing the material. Intermediate grinding can facilitate uniformity while intermediate washing, typically with distilled water, reduces the risk of unwanted contaminants, such as starting material decomposition by products.

It has been discovered that firing the phosphor in the presence of a flux of one or a combination of akali metal ions incorporates alkali metal ion in the phosphor and dramatically increases its luminescence intensity. A preferred class of phosphors according to the present invention are those that satisfy the relationship:

$$DM_y \quad \text{(IV)}$$

or, specifically, for X-radiation stimulation $$Hf_{1-z}Zr_zM_y \quad \text{(V)}$$

where
M represents at least one alkali metal;
y is in the range of from $1 \times 10^{-4}$ to 1 (preferably 0.2); and
D and z are as defined above.

Investigations have revealed that the benefits of alkali metal ion inclusion are fully realized at relatively low concentrations and incorporation of alkali metal ions in concentrations above those required for maximum luminescence enhancement are not detrimental to luminescence. There is no phosphor performance basis for limiting y to values of 1 or less. Rather it is primarily a phosphor preparation convenience.

Alkali metal ion inclusion in the phosphor can be conveniently accomplished by forming a mixture of the hafnium and/or zirconium starting materials discussed above and a compound capable of releasing alkali metal ions on heating. The amount of the alkali metal compound employed is chosen to supply alkali metal ion in a concentration in excess of that sought to be incorporated in the phosphor. Thus, the following is contemplated as a starting material relationship:

$$DM_m \quad \text{(VI)}$$

or, specifically, for X-radiation stimulation $$Hf_{1-z}Zr_zM_m \quad \text{(VII)}$$

wherein
M represents at least one alkali metal;
m is greater than $3 \times 10^{-2}$ (preferably from $1 \times 10^{-1}$ to 6); and
D and z are as defined above.

The alkali metal compounds can be alkali metal analogues of the hafnium and zirconium starting materials discussed above. Preferred alkali metal compound starting materials include alkali metal carbonates, sulfates, oxalates, halides, hydroxides, borates, tungstates, and molybdates. Mixtures of alkali metal starting materials are contemplated, particularly when different alkali metals are being concurrently incorporated in the phosphor. Since in one form the hafnium and/or zirconium complexes of formula II can contain alkali metal ion, the alkali metal can wholly or in part be provided by these complexes. A convenient preparation approach is to employ alkali metal containing hafnium and/or zirconium complexes satisfying formula II and to increase the alkali metal content of the starting materials by adding other alkali metal compounds, as indicated above.

In relationships VI and VII, m can range of up to 10 or more. Most of the excess of alkali metal is removed during phosphor preparation. When an excess of alkali metal is incorporated in the phosphor, it is preferred to divide firing into two or more sequential steps with intermediate grinding and washing to remove soluble alkali metal compounds. This reduces the level of alkali metal compounds available for release during heating in a corrosive volatilized form and also reduces the possibility of forming less desirable secondary phases.

Investigation of alkali metal containing phosphors indicates that they exhibit increased levels of luminescence even after extended washing has reduced the alkali metal content to very low levels, approaching detection limits. While it is believed that the alkali metal is incorporated into the monoclinic crystals of the phosphor, this has not been conclusively established. It is possible that the alkali metal content of the phosphor is at least partially a surface remnant of the alkali metal flux on the surface of the monoclinic crystals during their formation during firing.

The highest levels of phosphor luminescence have been obtained by employing lithium as an alkali metal. In a preferred form lithium containing phosphors according to this invention satisfy the relationship:

$$DLi_y \quad \text{(VIII)}$$

or, specifically, for X-radiation stimulation $$Hf_{1-z}Zr_zLi_y \quad \text{(IX)}$$

wherein
y is in the range of from $8 \times 10^{-4}$ to 0.15 and
D and z are as defined above.

Lithium containing phosphors according to this invention are preferably prepared by selecting starting materials so that the hafnium, zirconium, and lithium ions present prior to heating satisfy the following relationship:

$$DLi_m \quad \text{(X)}$$

or, specifically, for X-radiation stimulation $$Hf_{1-z}Zr_zLi_m \quad \text{(XI)}$$

wherein
m is in the range of from $4 \times 10^{-2}$ to 2.0 (optimally from $7 \times 10^{-2}$ to 1.5) and
D and z are as defined above.

When lithium is selected as the alkali metal, it has been observed that, in addition to forming a hafnia phosphor host with lithium included, a second phase of lithium hafnate can be formed, depending upon the proportion and selection of lithium compound starting materials. Since titanium activated lithium hafnate lacks the luminescence intensities of titanium and lithium activated hafnia, a preferred embodiment of the invention, lithium starting materials and their concentrations are selected so that any overall luminescence of the two phases remains higher than that attained in the absence of lithium. Increasing levels of lithium carbonate employed as a starting material results first in an increase in overall luminescence eventually followed by a decrease in overall luminescence attributed to the formation of increasingly larger proportions of lithium hafnate. On the other hand, employing lithium sulfate as a starting material, increasing proportions result in peak luminescence with still higher proportions of lithium sulfate resulting in a relatively constant high level of luminescence, indicating that the proportion of lithium hafnate which is formed as a second phase is limited at higher lithium sulfate concentrations in the starting materials.

Sodium and potassium compounds employed as starting materials in place of lithium compounds also result in markedly increased levels of phosphor luminescence. These alkali metal starting materials, of course, avoid any possibility of forming a lithium hafnate second phase and can therefore be employed well above the preferred maximum concentration levels of lithium starting materials without any performance penalty. On the other hand, it has been observed that sodium and potassium ions are quite effective at lower concentrations. Therefore, when M in relationships IV and V represents at least one of sodium and potassium, y is preferably in the range of from $6\times10^{-4}$ to $7\times10^{-2}$ (optimally from $8\times10^{-4}$ to $7\times10^{-2}$).

The alkali metals cesium and rubidium are also effective to increase phosphor luminescence, but to a lesser extent than lithium, sodium, and potassium. Combinations of any and all of the alkali metals can be employed in preparing the phosphors of this invention. Particularly useful are combinations of at least two of lithium, sodium, and potassium ions. Lithium and potassium ion combinations have produced particularly high levels of luminescence.

The fluorescence efficiencies of the phosphors of this invention are increased by blending with the phosphor host before firing a small amount of a titanium activator. Titanium activation can be undertaken according to any conventional technique, such as any of the techniques described by Kroger, Brixner, and Sarver, cited above and here incorporated by reference. Hafnium, zirconium, and titanium are present and satisfy the relationship $$DTi_x \qquad (XII)$$

or, specifically, for X-radiation stimulation $$Hf_{1-z}Zr_zTi_x \qquad (XIII)$$

wherein
x is the range of from $3\times10^{-4}$ to 1.0 (preferably 0.5 and optimally 0.25) and
D and z are as defined above.

It is possible to introduce the titanium activator by physically mixing titania with any of the host phosphor forming materials described above. It has been discovered, however, that higher luminescence levels at lower titanium concentrations are possible when the titanium activator in the form of a thermally decomposable compound is physically blended with thermally decomposable hafnium and/or zirconium compounds. The thermally decomposable moieties of the titanium activator compounds can be selected from among the same compound classes described in connection with hafnium and zirconium. Titanium carboxylates, where the carboxylates are chosen as described above, are particularly preferred starting materials for the incorporation of titanium.

The inclusion of titanium in the host phosphor not only greatly increases the total luminescence of the phosphor, but also shifts the maximum emission wavelength of the phosphor from the ultraviolet to the blue portion of the spectrum. Emissions in the blue portion of the spectrum are more useful for intensifying screen use, since the silver halide emulsions of radiographic elements which are employed in combination with intensifying screens possess native blue sensitivity and/or can be readily spectrally sensitized to these wavelengths while the organic vehicle of the emulsion is transparent in the blue portion of the spectrum.

In a specifically preferred form of the invention the zirconium rich hafnia phosphors include both alkali metal ion and titanium, each introduced as described above. In this form the phosphor satisfies the relationship.

$$DM_yTi_x \qquad (XIV)$$

or, specifically, for X-radiation stimulation $$Hf_{1-z}Zr_zM_yTi_x \qquad (XV)$$

wherein
D, M, x, y, and z are as previously defined.

It has been surprisingly discovered that disproportionately large enhancements of luminescence are realized when both alkali metal ion and titanium are incorporated in the phosphor. That is, the luminescence increases imparted by each of the alkali metal ion and titanium alone when added together do not equal or even approach the magnitude of the luminescence increase imparted by a combination of alkali metal ion and titanium employed together in the phosphor.

To reduce the persistence of luminescence following stimulation (i.e., phosphorescence or afterglow) a small amount of indium is incorporated in the phosphor host as a dopant. The indium can be employed in any convenient amount effective to reduce afterglow. The phosphor in one completed form consists essentially of oxygen and combined elements satisfying one of the following relationships:

$$DTi_xIn_w \qquad (XVI)$$

$$Hf_{1-z}Zr_zTi_xIn_w \qquad (XVII)$$

$$DM_yTi_xIn_w \qquad (XVIII)$$

and
$$Hf_{1-z}Zr_zM_yTi_xIn_w \qquad (XIX)$$

wherein
w is in the range of from $1\times10^{-6}$ to $5\times10^{-3}$, preferably $2\times10^{-6}$ to $1\times10^{-3}$, and
D, M, w, y, and z are as previously defined.

When the concentration of indium is no greater than $1\times10\,3$, indium acts not only to reduce afterglow, but to also increase phosphor speed.

While it is possible to significantly reduce afterglow by the incorporation of indium, the addition of neodymium in combination with indium produces a further dramatic reduction in afterglow. In fact, the further addition of neodymium has been observed to reduce afterglow to the limits of detection capabilities—i.e., to eliminate afterglow. Since a small reduction of prompt emission is also produced by the presence of the neodymium in the absence of indium, it is a particular advantage of this invention that the indium can be used to eliminate any reduction in prompt emission attributable to the incorporation of neodymium.

The phosphor of the invention in a specifically preferred completed form consists essentially of oxygen and combined elements satisfying one of the following relationships:

$$DTi_xIn_wNd_v \qquad (XX)$$

$$Hf_{1-z}Zr_zTi_xIn_wNd_v \qquad (XXI)$$

$$DM_yTi_xIn_wNd_v \qquad (XXII)$$

and $$Hf_{1-z}Zr_zM_yTi_xIn_wNd_v \qquad (XXIII)$$

wherein v is up to $5\times10^{-4}$, preferably from $5\times10^{-8}$ to $2\times10^{-4}$ and optimally from $2\times10^{-6}$ to $1\times10^{-5}$; and D, M, w, y, and z are as previously defined.

When v is within the range of from $5\times^{-8}$ to $2\times10^{-4}$, significant afterglow reduction is observed, but at the lower end of the range afterglow is not eliminated and at the higher end of the range significant prompt emission reduction can occur. Within the optimum range of $v=2\times10^{-6}$ to $1\times10^{-5}$ afterglow is sharply reduced and prompt emission with indium also present remains near the levels observed in the absence of both indium and neodymium.

Indium and neodymium can be introduced into the phosphor during its preparation in any convenient conventional manner. For example, the techniques described above for titanium incorporation also permit indium alone or in combination with neodymium to be incorporated in the phosphor host. A preferred technique for indium and neodymium introduction is to mix a water soluble salt, such as indium or neodymium nitrate, in solution or to mix a salt or oxide of indium or neodymium in finely divided form with one of the zirconium and/or hafnium starting materials during or prior to titanium introduction. Indium and neodymium are distributed within the phosphor host as a dopant during firing.

The phosphors of this invention, once formed, can be employed to serve any conventional use for hafnia and/or zirconia phosphors. A specifically preferred application for the phosphors when z is 0.3 or less (i.e., in hafnia phosphor host formulations) is in X-ray intensifying screens. Aside from the inclusion of a phosphor satisfying the requirements of this invention, the intensifying screen can be of any otherwise conventional type. In its preferred construction the intensifying screen is comprised of a support onto which is coated a fluorescent layer containing the phosphor of this invention in particulate form and a binder for the phosphor particles. The phosphors can be used in the fluorescent layer in any conventional particle size range and distribution. It is generally appreciated that sharper images are realized with smaller mean particle sizes. Preferred mean particle sizes for the zirconium rich hafnia phosphors of this invention are in the range of from from 0.5 $\mu$m to 40 $\mu$m, optimally from 1 $\mu$m to 20 $\mu$m.

It is, of course, recognized that the phosphor particles can be blended with other, conventional phosphor particles, if desired, to form an intensifying screen having optimum properties for a specific application. Intensifying screen constructions containing more than one phosphor containing layer are also possible, with the phosphor particles of this invention being present in one or more of the phosphor containing layers.

The fluorescent layer contains sufficient binder to give the layer structural coherence. The binders employed in the fluorescent layers can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. Particularly preferred intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

The support onto which the fluorescent layer is coated can be of any conventional type. Most commonly, the support is a film support. For highest levels of image sharpness the support is typically chosen to be black or transparent and mounted in a cassette for exposure with a black backing. For the highest attainable speeds a white support, such as a titania or barium sulfate loaded or coated support is employed. Specifically preferred reflective supports offering the highest attainable balance of speed and sharpness are those containing reflective microlenslets, disclosed by Roberts et al U.S. Ser. No. 243,374, filed Sept. 12, 1988, titled AN X-RAY INTENSIFYING SCREEN PERMITTING AN IMPROVED RELATIONSHIP OF IMAGING SPEED AND SHARPNESS, commonly assigned now U.S. Pat. No. 4,912,333, issued Mar. 27, 1990.

Any one or combination of conventional intensifying screen features, such as overcoats, subbing layers, and the like, compatible with the features described above can, of course, be employed. Both conventional radiographic element and intensifying screen constructions are disclosed in *Research Disclosure*, Vol. 184, Aug. 1979, Item 18431, the disclosure of which and the patents cited therein are here incorporated by reference. *Research Disclosure* is published by Kenneth Mason Publications, Ltd., Emsworth, Hampshire P010 7DD, England.

In one specifically preferred form of the invention, illustrating intensifying screens satisfying the requirements of the invention intended to be employed with a separate silver halide emulsion layer containing radiographic element, the phosphor of this invention can be substituted for any of the conventional phosphors employed in either the front or back intensifying screens of Luckey, Roth et al U.S. Pat. No. 4,710,637, the disclosure of which is here incorporated by reference. Similar modification of any of the conventional intensifying screens disclosed in the following patents is also contemplated: DeBoer et al U.S. Pat. No. 4,637,898; Luckey, Cleare et al U.S. Pat. No. 4,259,588; and Luckey U.S. Pat. No. 4,032,471.

While the phosphors of the invention can be employed for their prompt emission following exposure to X-radiation, they can also be employed as storage phosphors—that is, for their ability to emit electromagnetic radiation in a chosen wavelength range after being exposed to X-radiation and then stimulated by exposure to radiation in a third spectral region. For example, the phosphors of this invention can be employed in storage phosphor screens and systems of the type disclosed by Luckey U.S. Pat. No. 3,859,527, the disclosure of which is here incorporated by reference. When employed in such a system the refractive indices of the phosphor and binder are preferably approximately matched, as disclosed by DeBoer et al U.S. Pat. No. 4,637,898, also incorporated by reference.

EXAMPLES

The invention can be better appreciated by reference to the following specific examples.

EXAMPLES 1-9

Phosphors Containing Varied Ratios of Hafnium and Zirconium ($Hf_{1-z}Zr_z$)

The purpose of presenting these investigations is to demonstrate that, by varying the zirconium content in a hafnia host phosphor, enhanced phosphor luminescence intensity is achieved over a limited zirconium concentration range in which the zirconium content is higher than that found in optical grade hafnium sources, but still only a minor constituent.

Hafnia phosphor samples containing varied amounts of zirconium substituted for hafnium were prepared by the decomposition of the appropriate trilactohafnic and trilactozirconic acid complexes. The complexes were prepared by the general method described in W. B. Blumenthal, "The Chemical Behavior of Zirconium," VanNostrand, Princeton, N.J., 1958, p. 333. The varying Hf:Zr ratios are obtained by using the appropriate mixtures of zirconium and hafnium oxychlorides in the precipitation reactions. The oxychlorides were obtained from Teledyne Wah Chang Albany (located at Albany, Ore.) and used as received. The Hf:Zr ratios in the samples were determined from the analytical batch analyses provided by the supplier.

The preparation of trilactohafnic acid for Example 1 was carried out in the following manner: Optical grade ($Hf_{1-z}Zr_z$, z=0.000276) hafnium oxychloride (40 g) and ACS reagent lactic acid (44 g) from Eastman Kodak Company were each dissolved in about 120 ml of distilled water. The hafnium oxychloride solution was added to the lactic acid solution with rapid stirring to form a precipitate, and the resulting mixture was heated to 80° C. with continued stirring for about 0.5 hours. The cooled mixture was filtered, and the collected solid was washed with distilled water. After drying for 15 hours at 80° C., the solid weighed 42 g. (for $C_9H_{16}O_{10}Hf$: theory, C=23.4%, H=3.5%; found, C=22.7%, H=3.5%).

Approximately 13 g of the trilactohafnic acid was placed in a 50 mL alumina crucible, covered with an alumina lid, heated in air to 700° C. for one hour in an ashing furnace, then cooled to room temperature. The solid was transferred to a 20 mL alumina crucible, which was covered with an alumina lid. The covered 20 mL alumina crucible was placed into a 50 mL alumina crucible, which was thereafter covered with an alumina lid. The crucible assembly was heated to 1000° C. and maintained at that temperature for 2.5 hours before cooling to room temperature. The resulting solid was ground with an agate mortar and pestle to give a powder that was returned to the 20 mL alumina crucible. The 20 mL crucible was covered with its alumina lid and then heated to 1400° C. and maintained at that temperature for 1.5 hours before cooling to room temperature. The resulting solid was ground with an agate mortar and pestle to give a uniform phosphor powder.

The Example 1 phosphor powder sample was made from optical grade hafnium oxychloride and contained the lowest amount of zirconium. The Example 5 sample was made from reagent grade (designated by the supplier as Reactor Grade Special and subsequently also referred to as R.G.S.) hafnium ($Hf_{1-z}Zr_z$, z=0.019) oxychloride. The Example 2, 3, 4A, and 4B samples were made by mixing appropriate amounts of the optical grade and reagent grade hafnium oxychlorides. The Example 6 to 9 samples were made by mixing appropriate amounts of reagent grade hafnium and zirconium oxychloride to obtain a zirconium content indicated in Table II.

The luminescence response of the phosphor powder was in this and all subsequent Examples measured by placing the phosphor powder sample in aluminum planchets (2mm high×24 mm diam) at a coverage of about 1.1 g/cm$^2$ and exposing to X-radiation. The X-ray response was obtained using a tungsten target X-ray source in an XRD 6 TM generator. The X-ray tube was operated at 70 kVp and 10 mA, and the X radiation from the tube was filtered through 0.5 mm Cu and 1 mm Al filters before reaching the sample. The luminescent response was measured using an IP-28 TM photomultiplier tube at 500 V bias. The voltage from the photomultiplier was measured with a Keithley TM high impedance electrometer and is proportional to the total light output of the sample.

The major luminescence peak of the phosphor samples was centered at about 280 nm. This value was obtained by taking the prompt emission spectrum of the powder using the unfiltered X-ray source described above. The tube was operated at 70 kVp and 30 mA. The spectrum was acquired with an Instruments S.A. Model HR 320 TM grating spectrograph equipped with a Princeton Applied Research Model 1422/01 TM intensified linear diode array detector. The data acquisition and processing was controlled by a Princeton Applied Research Model 1460 OMA III TM optical multichannel analyzer. The spectrum was corrected for the spectral response of the detector-spectrograph combination.

The relative luminescence intensity of the phosphor powder samples as a function of their zirconium content is set out in Table II.

TABLE II

| | $Hf_{1-z}Zr_z$ | |
|---|---|---|
| EXAMPLE NO. | Zr CONTENT (z) | RELATIVE INTENSITY |
| 1 (Control) | 0.000276 | 100 |
| 2 | 0.00040 | 231 |
| 3 | 0.0010 | 238 |
| 4A | 0.01 | 710 |
| 4B | 0.01 | 743 |
| 5 | 0.019 | 365 |
| 6 | 0.10 | 350 |
| 7 | 0.20 | 155 |
| 8 | 0.30 | 224 |
| 9 (Control) | 0.50 | 80 |

The data of Table II demonstrate that there is an enhancement in hafnia phosphor performance when the zirconium level increased over that found in optical grade hafnium sources (represented by the Control 1). Ranges of z of from $4 \times 10^{-4}$ (0.0004) to 0.3 are demonstrated to exhibit higher luminescence intensities than optical grade hafnia. Best results are demonstrated when z is in the range of from $1 \times 10^{-3}$ (0.001) to 0.2, optimally in the range of from $5 \times 10^{-3}$ (0.005) to 0.1.

EXAMPLES 10-14

Preparation of Phosphors in the Presence of an Alkali Metal Ion (DM$_m$)

The purpose of presenting these investigations is to demonstrate that the performance of hafnia host phosphors with an elevated zirconium level shown to be effective in Examples 1-9 can be further dramatically improved by preparing the hafnia phosphor in the presence of an alkali metal ion.

In each example a sample consisting of 14.72 grams of trilactohafnic acid (prepared as described in Examples 1-9 from RGS hafnium oxychloride, $z=0.019$) was thoroughly ground with an agate mortar and pestle with $K_2CO_3$ or $Li_2CO_3$ (Alfa Products; Ultra Pure grade). The mole percent of the alkali carbonate flux, based on hafnium, was chosen as indicated below in Table III. The mixtures prepared were heated as described above in Examples 1-9, except for the addition of a washing step after firing to 1000° C. This step involved washing the charge with 150 mL of distilled water for 1 hour. The solid was collected and dried for 5 minute intervals at 20, 35 and 50% power in a 500W CEM model MDS-81 TM microwave oven. The procedure described above in Examples 1-9 was then completed.

X-ray diffraction analysis of the samples confirmed the presence of monoclinic hafnia. The presence of alkali metal ion in the phosphor powder samples prepared in the presence of alkali carbonate flux was confirmed by atomic absorption analysis.

TABLE III

| Example | DM$_m$ M | DM$_m$ m | Intensity (Ex. 1 = 100) |
|---|---|---|---|
| 5 | — | — | 365 |
| 10 | K | 0.2 | 520 |
| 11 | K | 0.5 | 510 |
| 12 | K | 2.0 | 545 |
| 13 | K | 4.0 | 1005 |
| 14 | Li | 0.14 | 1005 |

A 140 to 275 percent increase in luminescence intensity relative to Example 5 is seen in the above examples containing alkali metal ion.

Referring back to Example 1, it is apparent that the hafnia phosphor samples containing both zirconium in higher levels than found in optical grade hafnium sources and alkali metal ion exhibit luminescence intensities ranging from >5 to >10 times those demonstrated by the hafnia phosphor Prepared from an optical grade hafnium source.

EXAMPLES 15-18

Titanium Activated Phosphors (DTi$_x$)

The purpose of presenting these investigations is to demonstrate the utility of titanium as an activator for the hafnia phosphors of this invention containing higher than optical grade concentrations of zirconia. The titanium also shifts the maximum spectral emission band of the phosphor to visible wavelengths in the blue portion of the spectrum.

In each example a sample consisting of 14.72 grams of trilactohafnic acid (prepared as described above in Examples 1-9, $z=0.019$) was thoroughly ground with varying portions of ammonium bis(oxalato) oxotitanium (IV), $(NH_4)_2TiO(C_2O_4)_2 2H_2O$, from Johnson Matthey (99.998%). The mole percent titanium, based on hafnium, is indicated below in Table IV. The mixtures were heated and further examined as in Examples 1-9.

X-ray diffraction analyses of Examples 17 and 18 each showed traces of unreacted TiO$_2$. A small amount of hafnium titanate was detected as an impurity phase in Example 18.

The relative luminescence outputs of Examples 5 and 15-18 are set out in Table IV. Not only were the luminescence outputs greatly increased in Examples 15-18, but the luminescence band maximum shifted to 475 nm, thereby providing increased emissions of visible spectrum wavelengths more advantageous for intensifying screen applications.

TABLE IV

| Example | DTi$_x$ x | Intensity (Ex. 1 = 100) |
|---|---|---|
| 5 | — | 365 |
| 15 | 0.02 | 5330 |
| 16 | 0.05 | 4000 |
| 17 | 0.10 | 2730 |
| 18 | 0.25 | 1680 |

From Table IV it is apparent that the inclusion of titanium in the hafnia phosphor samples containing higher than optical grade zirconium concentrations resulted in large increases in luminescence intensities. Thus, the titanium acted as an activator for the phosphor samples.

EXAMPLES 19-33

Preparation of Titanium Activated Phosphors in the Presence of Lithium Carbonate (DTi$_x$L$_m$)

The purpose of presenting these investigations is to demonstrate that the performance of hafnia host phosphors with an elevated zirconium level ($z=0.019$) and containing titanium as an activator can be further improved by preparing the hafnia phosphor in the presence of an alkali metal ion.

A sample consisting of 12.26 g of trilactohafnic acid (prepared as in Examples 1-9) was thoroughly ground with 0.1 g (5 mole percent, $x=0.05$) of TiO$_2$ (EM Chemicals; Optipur grade) and a selected amount of Li$_2$CO$_3$ (Alfa Products; Ultrapure grade). The mixtures were processed and tested similarly as in Examples 10-14. In Examples 21-23 the size of the trilactohafnic acid sample was 13.00 grams with the titania increased to 0.106 g to maintain the titanium at 5 mole percent ($x=0.05$).

The relative intensity of the titanium activated phosphor samples as a function of the alkali metal flux employed is given in Table V.

TABLE V

| Example | DTi$_x$M$_m$ m | Intensity (Ex. 1 = 100) |
|---|---|---|
| 19 | 0 | 2520 |
| 20 | 0.01 | 2210 |
| 21 | 0.02 | 1000 |
| 22 | 0.06 | 3380 |
| 23 | 0.10 | 6370 |
| 24 | 0.10 | 5960 |
| 25 | 0.20 | 13500 |
| 26 | 0.20 | 14000 |
| 27 | 0.40 | 13700 |
| 28 | 0.50 | 13300 |
| 29 | 0.50 | 13500 |
| 30 | 1.0 | 8695 |
| 31 | 1.5 | 5610 |
| 32 | 2.0 | 3155 |

TABLE V-continued

| | $DTi_xM_m$ | |
|---|---|---|
| Example | m | Intensity (Ex. 1 = 100) |
| 33 | 4.0 | 735 |

Samples in which more than 10 mole percent (m=0.20) $Li_2CO_3$ was added revealed the presence of lithium hafnate in the X-ray powder patterns. The amount of lithium hafnate formed in the samples increased with the $Li_2CO_3$ amount. At 200 mole percent (m=4.0) $L_tCO_3$ added, lithium hafnate is the primary phase.

From Table V it can be appreciated that values of m of from about $4 \times 10^{-2}$ (0.04) to 2.0 gave significantly improved results, with values of m of from about $1 \times 10^{-1}$ (0.10) to 1.5 providing the highest luminescence intensities observed in these comparisons.

In these comparisons it should be noted that Example 19 did not provide luminescence intensity as high as that reported in Table IV for Example 16, even though both contained 5 mole percent titanium (x=0.05) and neither was prepared in the presence of an alkali metal flux. This difference is attributed to the less efficient incorporation of the titanium activator in Example 19 resulting from employing titania rather than a titanium carboxylate salt as a starting material.

EXAMPLES 34-43

Preparation of Titanium Activated Phosphors in the Presence of Lithium Sulfate ($DTi_xLi_m$)

The purpose of presenting these investigations is to demonstrate that the proportions of lithium hafnate formed as a second phase can be controlled and reduced by substituting another lithium salt for lithium carbonate.

The same procedures were employed as in Examples 19-33, except that for $Li_2CO_3$ there was substituted $Li_2SO_4$ (Aldrich anhydrous: 99.99%).

The relative intensity of the titanium activated phosphor samples as a function of the lithium sulfate flux employed is given in Table VI. In Table VI the performance data from Table V is also represented for samples prepared using lithium carbonate at the same concentration levels as the lithium sulfate.

TABLE VI

| | | $DTi_xM_m$ | | | |
|---|---|---|---|---|---|
| | $Li_2CO_3$ | | | $Li_2SO_4$ | |
| Example | m | Intensity | Example | m | Intensity |
| 20 | 0.01 | 2210 | 34 | 0.01 | 1545 |
| 21 | 0.02 | 1000 | 35 | 0.02 | 1545 |
| | | | 36 | 0.04 | 2105 |
| 22 | 0.06 | 3380 | 37 | 0.06 | 3605 |
| 23 | 0.10 | 6370 | 38 | 0.10 | 7645 |
| 24 | 0.10 | 5960 | | | |
| 25 | 0.20 | 13500 | 39 | 0.20 | 9115 |
| 26 | 0.20 | 14000 | | | |
| 28 | 0.50 | 13300 | 40 | 0.50 | 12400 |
| 30 | 1.0 | 8695 | 41 | 1.0 | 9820 |
| 32 | 2.0 | 3155 | 42 | 2.0 | 9330 |
| 33 | 4.0 | 735 | 43 | 4.0 | 9185 |

The most important advantage of employing lithium sulfate as a flux as compared to lithium carbonate is that a reduced amount of the lithium hafnate phase is produced. This results in significant improvements in phosphor luminescence when higher proportions of the lithium flux are employed during phosphor formation.

At lower, preferred flux concentrations the lithium carbonate flux yields higher luminescence.

EXAMPLES 44-47

Preparation of Phosphors in the Presence of Varied Alkali Metal Ions

The purpose of presenting these investigations is to demonstrate that all of the alkali metals significantly enhance phosphor luminescence.

Example 25 was repeated, except that 10 mole percent (m=0.2) of another alkali metal carbonate was substituted for lithium carbonate: $Na_2CO_3$ (0.265 g; EM Chemicals Suprapur Reagent), $K_2CO_3$ (0.346 g; Alfa Products Ultrapure grade), $Rb_2CO_3$ (0.5774 g; AESAR 99.9%), or $Cs_2CO_3$ (0.8146 g; AESAR 99.9%).

The luminescence intensities measured for the resulting samples are set out in Table VII.

TABLE VII

| Example | Carbonate source | Intensity (Ex. 1 = 100) |
|---|---|---|
| 19 | None | 2520 |
| 25 | $Li_2CO_3$ | 13500 |
| 44 | $Na_2CO_3$ | 10400 |
| 45 | $K_2CO_3$ | 5400 |
| 46 | $Rb_2CO_3$ | 3645 |
| 47 | $Cs_2CO_3$ | 4840 |

From Table VII it is apparent that all of the alkali metals are effective to increase the luminescence of the hafnia phosphors prepared from sources having higher zirconium contents than found in optical grade sources of hafnium. From Table VII it is observed that the lower the atomic number alkali metals lithium, sodium, and potassium offer a significant performance advantage over the heavier alkali metals rubidium and cesium when equal starting concentrations are employed.

EXAMPLES 48-51

Preparation of Phosphors Using Varied Alkali Metal Compounds

The purpose of presenting these investigations is to demonstrate the utility of alkali metal compounds completed by moieties other than sulfate and carbonate.

Example 25 was repeated, except that one of the following lithium sources was substituted for lithium carbonate: 0.2548 g $Li_2C_2O_4$ (10 mole percent, m =0.2, Alfa Products reagent grade), 0.212 g LiCl (20 mole percent, m=0.2, Alfa Products anhydrous Ultrapure grade), 0.4343g LiBr (20 mole percent, m=0.2, MCB anhydrous) or 0.21 g $LiOH \cdot H_2O$ (20 mole percent, m=0.2, MCB reagent).

The luminescence intensities are given in Table VIII.

TABLE VIII

| Example | Lithium Cmpd. | Intensity (Ex. 1 = 100) |
|---|---|---|
| 19 | None | 2520 |
| 48 | $Li_2C_2O_4$ | 12695 |
| 49 | LiCl | 6730 |
| 50 | LiBr | 9400 |
| 51 | $LiOH:H_2O$ | 13185 |

From Table VIII it is apparent that all of the lithium compounds improve the luminescence of the phosphor. While both lithium hydroxide and lithium oxalate produced significantly higher levels of luminescence than the lithium halides, alkali carboxylates are clearly more convenient to handle than alkali hydroxides.

EXAMPLES 52-54

Enhancement of Phosphor Luminescence by a Combination of Titanium and Alkali Metal Ion The purpose of presenting these investigations is to demonstrate the synergistic improvement of luminescence produced by the combination of an alkali metal ion and the titanium activator.

EXAMPLE 52

A sample consisting of 13.475 g of trilactahafnic acid (prepared as described in Examples 1-9) was thoroughly ground in an agate mortar and Pestle with 0.2032 g $Li_2CO_3$ (10 mole percent, m=0.2, Alfa Products Ultrapure grade) and processed as in Examples 10-14.

EXAMPLES 53

Example 15 was repeated, except that 13.475 g of trilactohafnic acid was used with 0.44 g of $TiO_2$ (2 mole percent, x=0.02, EM chemicals Optipur grade).

EXAMPLE 54

Example 53 was repeated, except for the addition of 0.2032 g $Li_2CO_3$ (10 mole percent, m=0.2, Alfa Products Ultrapure grade) in the starting mixture.

The luminescence performances of Examples 5 and 52-54 are compared in Table IX.

TABLE IX

| Example | Additions | Intensity (Ex. 1 = 100) |
|---|---|---|
| 5 | none | 365 |
| 52 | 10 mole % $Li_2CO_3$ | 1120 |
| 53 | 2 mole % $TiO_2$ | 5690 |
| 54 | 10 mole % $Li_2CO_3$ + 2 mole % $TiO_2$ | 14600 |

From Table IX it is apparent that a disproportionately large increase in luminescence was realized by employing both the titanium activator and the alkali metal ion. While each of the titanium and alkali metal alone enhanced luminescence, a larger increase in luminescence was attained when titanium and alkali metal ion were employed together than could have been predicted assuming the separate enhancements of luminescence to be fully additive.

EXAMPLES 55-62

Phosphors Containing 5 Mole Percent or Less Titanium

The purpose of presenting these investigations is to demonstrate the enhancements in luminescence produced by the use as starting materials of titanium at concentrations of 5 mole percent (x=0.05) and less, thereby presenting a better performance definition of the lower ranges of titanium concentrations.

Potassium tetraoxalatohafnate (IV) 5 hydrate was prepared as described in Inorg. Syn., VIII, 42 (1966) using R.G.S. hafnium oxychloride 8 hydrate (z=0.019). Upon drying at 70°-90° C. for 1-16 hours in a convection oven, the product analyzed at closer to a 3-hydrate composition and all subsequent use of this material was calculated as the 3-hydrate. Fifteen grams of the material was thoroughly ground in an agate mortar and pestle with 0.03-5 mole percent of potassium bis(oxalato)oxotitanate (IV) 2-hydrate (Alfa Products, recrystallized from ethanol). The mixtures were placed in 20 mL alumina crucibles, covered with alumina lids, and then placed in 100 mL alumina crucibles, which were covered with alumina lids. The samples were heated in air to 1000° C. for 2.5 hours, then cooled to room temperature. The resulting solids were removed from the crucibles, broken into small Pieces with an alumina mortar and pestle and washed by stirring in 50 mL of distilled water. The solids were then collected and dried in a convection oven at 80° C. The charges were placed in 10 mL alumina crucibles with alumina lids and heated in air to 1300° C. for 2 hours, followed by cooling to room temperature.

The luminescence intensities of the samples are set out in Table X.

TABLE X

| Example | Mole percent Ti | Intensity (Ex. 1 = 100) |
|---|---|---|
| 5 | None | 365 |
| 55 | 0.03 | 5750 |
| 56 | 0.3 | 6128 |
| 57 | 1 | 9470 |
| 58 | 2 | 10500 |
| 59 | 3 | 8420 |
| 60 | 3 | 9820 |
| 61 | 4 | 8060 |
| 62 | 5 | 9120 |

From Table X it is apparent that even at the lowest concentrations of titanium where ($DTi_x\dot{x}=3\times10^{-4}$, Example 55) much higher levels of luminescence are observed than in Example 5, which lacked titanium. While some of the enhancement in luminescence as compared to Example 5 can be attributed to the presence of potassium, comparing luminescence values from Table III, in which potassium was introduced without titanium being present, it is apparent that a part of the luminescence enhancement must be attributed to additional presence of the titanium.

EXAMPLES 63-68

Varied Levels of Zirconium in Phosphors Prepared in the Presence of Alkali Metal Ion The purpose of presenting these investigations is to demonstrate the effect of varied levels of zirconium in the hafnia host phosphor when the hafnia Phosphor was prepared in the Presence of alkali metal ion.

Two grades of potassium tetraoxalatohafnate (IV) 3-hydrate were prepared as in Example 55 from optical grade hafnium oxychloride 8-hydrate and R.G.S. hafnium oxychloride 8-hydrate. Potassium tetraoxalatozirconate 3 hydrate was prepared as in Example 55 from R.G.S. zirconium oxychloride 8-hydrate. A series of $Hf_{1-z}Zr_zO_2$ samples in which z was varied from $2.76\times10^{-4}$ to $6.84\times10^{-2}$ were prepared from mixtures of the above precursors. The powders were combined and ground in an agate mortar and pestle. The procedures of Examples 55-62 were employed, with the addition of 10 mole percent $K_2CO_3$ (Alfa Products Ultrapure grade) to each sample.

Luminescence intensities as a function of zirconium levels (z) are given in Table XI.

TABLE XI

| Example | z | Intensity (Ex. 1 = 100) |
|---|---|---|
| 63 (Control) | $2.8\times10^{-4}$ | 380 |
| 64 | $4.3\times10^{-4}$ | 165 |
| 65 | $9.6\times10^{-3}$ | 770 |
| 66 | $1.9\times10^{-2}$ | 520 |
| 67 | $4.0\times10^{-2}$ | 595 |
| 68 | $6.0\times10^{-2}$ | 610 |

Note that Example 66 was identical to Example 10, except for employing a different final firing temperature, and the luminescence measured was identical.

Table XI demonstrates that hafnia prepared from optical grade sources as in Control Example 63 yields inferior luminescence as compared to samples in which the zirconium content z is equal to at least $1 \times 10^{-2}$. Comparing Tables II and XI, it is apparent that the presence of potassium ion is responsible for a significant increase in luminescence at zirconium levels equal to that in R.G.S. hafnia (z=0.019) and above.

EXAMPLES 69–72

Determinations of Alkali Metal Ion Incorporation in Phosphors Differing in Zirconium Levels The purpose of presenting these investigations is to provide quantitative determinations of alkali ion incorporation levels (y) in several phosphors satisfying the general relationship $Hf_{1-z}Zr_zTi_xM_y$ and having differing zirconium level (z) satisfying the requirements of the invention.

Samples were prepared as in Examples 63–68, except for the further addition of 0.2151 g of recrystallized potassium bis(oxalato)oxotitanate (IV) 2-hydrate (Alfa Products) to satisfy the ratio x=0.03.

Proportions of zirconium, titanium, and potassium ion in the completed phosphor samples were determined by atomic absorption analysis and inductively coupled plasma spectrometry. The luminescence of the phosphors together with their alkali ion content observed on analysis, y(obs), are reported in Table XII. The amounts of zirconium and titanium present in the starting materials, z(calc) and x(calc), are compared in Table XII to the amounts of zirconium and titanium found on analysis, z(obs) and x(obs).

TABLE XII $HF_{1-z}Zr_zTi_xM_y$

| Ex. | Intensity (Ex. 1 = 100) | z(calc) | z(obs) | x(calc) | x(obs) | y(obs) |
|-----|-------------------------|---------|--------|---------|--------|--------|
| 69  | 9820 | $4.3 \times 10^{-4}$ | $4.31 \times 10^{-4}$ | 0.03 | 0.022 | 0.022 |
| 70  | 9820 | $9.6 \times 10^{-4}$ | $8.79 \times 10^{-4}$ | 0.03 | 0.026 | 0.019 |
| 71  | 9820 | $1.9 \times 10^{-2}$ | $1.78 \times 10^{-2}$ | 0.03 | 0.031 | 0.025 |
| 72  | 9820 | $4.0 \times 10^{-2}$ | $3.87 \times 10^{-2}$ | 0.03 | 0.027 | 0.023 |

Although all samples exhibited similar luminescence, when a corresponding phosphor was formed from optical grade hafnium starting materials [z(obs)=$2.91 \times 10^{-4}$], a significantly lower luminescence was observed.

EXAMPLES 73–105

Indium, Gallium, and Rare Earth Incorporations

The purpose of presenting these investigations is to demonstrate advantages derived from the introduction of indium alone or in combination with neodymium to hafnia host phosphors containing titanium as an activator.

A hydrous hafnia precursor was prepared by a conventional preparation method. Suitable methods are those disclosed for preparing hydrous zirconia by M. Shibagaki, K. Takahasi, and M. Matsushita, *Bull. Chem. Soc. Japan*, 61, 3283 (1988) and A. Benedetti, G. L Fagherazzi, and F. Pinna, *J. Am. Ceram. Soc.*, 72, 467 (1989) Samples of 1.0 mole R.G.S. hafnium oxychloride ($Hf_{1-z}Zr_z$, z=0.010) from Teledyne Wah Chang Albany and 2.1 mole of sodium hydroxide pellets from Eastman Kodak Company were each dissolved in 1.0 liter of distilled water. The solutions were added simultaneously to a precipitation vessel with rapid stirring. The resulting gelatinous solid was collected by vacuum filtration and then dried using a rotary evaporator. The solid was washed three times with 4 liters of distilled water. The collected material was then dried for 16 hours at 50° C. in a convection oven.

In each example a 0.0265 mole sample of precursor hydrous hafnia was employed. In all examples, except Example 73, the sample was treated with a measured mole percent of a gallium or indium and/or rare earth ion source, either in the form of an aqueous solution or a solid. After addition the ingredients were thoroughly mixed. In those instances in which a solution was used the samples were oven dried. Eight mole percent (based on hafnium) lithium carbonate (Aldrich, 99.997%) and 5 mole percent titanium dioxide (Aldrich 99.99%) were thoroughly ground and mixed into each sample. Each sample was placed in a 10 mL alumina crucible and covered with an alumina lid. The crucibles were heated to 1000° C. and maintained at that temperature for 2.5 hours before being allowed to cool to room temperature. The samples were each washed in 150 mL of distilled water for one hour and then collected by vacuum filtration and dried for 5 minute intervals at 20, 35 and 50 percent power in a microwave oven. The samples were then returned to their 10 mL crucibles in ambient air, covered, and heated to 1300° C. and maintained at that temperature for 1.5 hours before being allowed to cool to room temperature. The resulting powders were ground to give uniform phosphor powders.

To provide the best possible control for purposes of comparison, several Example 73 control samples were prepared. During each firing of gallium or indium and/or rare earth doped phosphor samples one of the Example 73 control samples was present so that the control would experience exactly the same firing conditions as the rare earth doped phosphor being investigated. In the tables below, when the gallium or indium and/or rare earth doped phosphors reported were not all fired simultaneously, the relative intensity and afterglow for the control Example 73 was an average of the controls fired with that group of phosphors. Relative intensities of the control samples ranged from 13,460 to 14,520 (Ex. 1=100). To facilitate comparisons, the relative intensity and relative afterglow characteristics of the control sample (or control sample average) reported in the tables below were each set at 100.

The afterglow characteristics of each phosphor sample were determined by placing the sample in a chamber and exposing it to X-radiation from a tungsten target, beryllium window tube operated at 70kVp and 10 mA, filtered with 0.5 mm Cu and 1 mm Al. The phosphor samples were prepared by placing the phosphor powder in aluminum planchets (2 mm deep ×24 mm diameter) at a coverage of about 1.1 g/cm². The emitted light was detected by a photomultiplier tube, the output current of which was measured by a voltmeter across a load resistor. The voltmeter reading served as an input to an x-y recorder which plotted the variation of voltage as a function of time. Constant irradiation by X-rays of each sample produced a steady state reading on the voltmeter, which was adjusted to 100% on the x-y recorder. The X-radiation was then shut off, and the decay of the light emitted by each sample was monitored. The elapsed time required for the signal to decay to 1% of its steady state value was then read off the x-y plot. The minimum elapsed time measurable by this technique was 0.35 second. References to "afterglow at or below detection limits" are intended to indicate an elapsed time to reach 1% of steady state emission levels of 0.35 second or less. As employed herein, statements of afterglow elimination indicate afterglow at or below detection limits. To facilitate comparison, control Example 73, lacking gallium, indium, or rare earth, was assigned a relative afterglow value of 100 percent, and the successive examples were assigned a relative afterglow value based on its relationship to control Example 73.

COMPARATIVE EXAMPLES 73–85

Neodymium Addition

The purpose of presenting these investigations is to demonstrate that host phosphors satisfying the requirements of this invention having their intensity of prompt emission increased by titanium incorporation have their prompt emission reduced by the incorporation of neodymium in amounts sufficient to reduce afterglow. Neodymium ions were provided in the form of aqueous solutions of $Nd(NO_3)_3 5H_2O$ (Alfa, 99.9%) in Examples 74–81 inclusive with the solid nitrate being used in Examples 82–85 inclusive.

The relative luminescence outputs and afterglow values of the neodymium doped samples and the control lacking neodymium addition are set out in Table XIII.

TABLE XIII

| | $DTi_xNd_v$ | | |
|---|---|---|---|
| Example | v | Relative Intensity | Relative Afterglow |
| 73a (Control) | 0.00 | 100 | 100 |
| 74(Comp. Ex.) | $1.25 \times 10^{-7}$ | 98 | 63 |
| 75(Comp. Ex.) | $2.5 \times 10^{-7}$ | 94 | 43 |
| 76(Comp. Ex.) | $5.0 \times 10^{-7}$ | 97 | 55 |
| 77(Comp. Ex.) | $1.0 \times 10^{-6}$ | 93 | 23 |
| 78(Comp. Ex.) | $5.0 \times 10^{-6}$ | 90 | 1.4 |
| 79(Comp. Ex.) | $1.0 \times 10^{-5}$ | 86 | * |
| 80(Comp. Ex.) | $2.5 \times 10^{-5}$ | 82 | * |
| 81(Comp. Ex.) | $1.0 \times 10^{-4}$ | 70 | * |
| 82(Comp. Ex.) | $2.0 \times 10^{-4}$ | 63 | * |
| 83(Comp. Ex.) | $5.0 \times 10^{-4}$ | 61 | * |
| 84(Comp. Ex.) | $1.0 \times 10^{-3}$ | 57 | * |
| 85(Comp. Ex.) | $2.0 \times 10^{-3}$ | 50 | * |

*Afterglow at or below detection limit with relative afterglow not exceeding 1

From Table XIII it is apparent that in all instances the prompt emission relative intensity of the phosphor was reduced by the incorporation of neodymium.

EXAMPLES 86–93

Indium Addition

The purpose of presenting these investigations is to demonstrate that host phosphors satisfying the requirements of this invention having their intensity of prompt emission increased by titanium incorporation have their intensity of prompt emission further increased and their afterglow significantly reduced by the incorporation of indium. Indium ions were provided in the form of aqueous solutions of indium nitrate in Examples 86 and 87 or solid indium oxide in Examples 88–93 inclusive.

The relative luminescence outputs and afterglow values of the neodymium doped samples and the control lacking rare earth addition are set out in Table XIV.

TABLE XIV

| | $DTi_xIn_w$ | | |
|---|---|---|---|
| Example | w | Relative Intensity | Relative Afterglow |
| 73b(Control) | 0.00 | 100 | 100 |
| 86 | $2.5 \times 10^{-6}$ | 106 | 89 |
| 87 | $5.0 \times 10^{-5}$ | 113 | 68 |
| 88 | $1.0 \times 10^{-4}$ | 118 | 69 |
| 89 | $2.5 \times 10^{-4}$ | 118 | 64 |
| 90 | $5.0 \times 10^{-4}$ | 105 | 67 |
| 91 | $1.0 \times 10^{-3}$ | 102 | 46 |
| 92 | $3.5 \times 10^{-3}$ | 81 | 32 |
| 93 | $5.0 \times 10^{-3}$ | 68 | 30 |

From Table XIV it is apparent that a significant reduction in afterglow can be realized when indium is incorporated in concentrations range from $w=1.0\times10^{-6}$ to $5\times10^{-3}$. At higher concentrations reductions in prompt emission relative intensity are objectionably large. When indium concentrations are in the range of from $w=2\times10^{-6}$ to $1\times10^{-3}$, the phosphors exhibit both significant increases in prompt emission relative intensity and significant reductions in afterglow.

EXAMPLES 94–99

Indium and Neodymium Additions

The purpose of presenting these investigations is to demonstrate that host phosphors satisfying the requirements of this invention having their intensity of prompt emission increased by titanium incorporation and their afterglow eliminated by the incorporation of neodymium exhibit little, if any, loss of prompt emission relative intensity by the further addition of indium. Indium was provided as described in Examples 86–93 above. Aqueous solutions of neodymium were prepared from $Nd(NO_3)_3 6H_2O$ (REacton, 99.99%, Rare Earth Products) and were used in Examples 94 to 99 inclusive.

The relative luminescence outputs and afterglow values of the indium and neodymium doped samples and the control lacking either indium and neodymium addition are set out in Table XV.

TABLE XV

| | $DTi_xIn_wNd_v$ | | |
|---|---|---|---|
| Example | Concentration | Relative Intensity | Relative Afterglow |
| 73c(Control) | 0.00 | 100 | 100 |
| 94 | $w(5.0 \times 10^{-5})$ $v(5.0 \times 10^{-6})$ | 98 | * |
| 95 | $w(5.0 \times 10^{-5})$ $v(1.0 \times 10^{-5})$ | 95 | * |
| 96 | $w(1.5 \times 10^{-4})$ $v(5.0 \times 10^{-6})$ | 101 | * |
| 97 | $w(1.5 \times 10^{-4})$ $v(1.0 \times 10^{-5})$ | 96 | * |
| 98 | $w(2.5 \times 10^{-4})$ $v(5.0 \times 10^{-6})$ | 102 | * |
| 99 | $w(2.5 \times 10^{-4})$ $v(1.0 \times 10^{-5})$ | 96 | * |

*Afterglow at or below detection limit with relative afterglow not exceeding 1

From Table XV it is apparent that afterglow was eliminated without any loss in the prompt emission intensity of the phosphor. By comparing Tables XIII and XV it is apparent that the combination of indium and neodymium is superior to the use of neodymium alone in titanium activated hafnia host phosphors.

Investigations substituting other rare earths for neodymium is hafnia host phosphors containing indium have produced results ranging from somewhat better to somewhat worse than that obtained using indium along as a dopant for titanium activated hafnia host phosphors. In no instance was afterglow eliminated by a combination of indium and other rare earth dopants.

COMPARATIVE EXAMPLES 100–105

Gallium Addition

The purpose of presenting these investigations is to demonstrate that host phosphors satisfying the requirements of this invention having their intensity of prompt emission increased by titanium incorporation do not benefit to any significant degree by the incorporation of gallium. Gallium ions were provided in the form of an aqueous solution of gallium nitrate in Example 100 and as solid gallium nitrate in Examples 101–105.

The relative luminescence outputs and afterglow values of the neodymium doped samples and the control lacking rare earth addition are set out in Table XVI.

TABLE XVI

| | $DTi_xGa_w$ | | |
|---|---|---|---|
| Example | w | Relative Intensity | Relative Afterglow |
| 73d (Control) | 0.00 | 100 | 100 |
| 100 (Comp. Ex.) | $2.5 \times 10^{-6}$ | 101 | 89 |
| 101 (Comp. Ex.) | $5.0 \times 10^{-5}$ | 100 | 96 |
| 102 (Comp. Ex.) | $1.0 \times 10^{-4}$ | 98 | 97 |
| 103 (Comp. Ex.) | $2.5 \times 10^{-4}$ | 97 | 111 |
| 104 (Comp. Ex.) | $5.0 \times 10^{-4}$ | 100 | 103 |
| 105 (Comp. Ex.) | $1.0 \times 10^{-3}$ | 102 | 98 |

From Table XVI it is apparent that gallium has little influence on prompt emission relative intensity and mixed effects on afterglow, ranging from reducing afterglow slightly at the lowest concentration to markedly increasing afterglow at a higher concentration.

The invention has been described in detail with particular reference to preferred embodiments thereof, but it will be understood that variations and modifications can be effected within the spirit and scope of the invention.

What is claimed is:

1. A screen comprised of
   a support and
   a fluorescent layer containing a phosphor capable of absorbing X-radiation and emitting longer wavelength electromagnetic radiation comprised of monoclinic crystals of a titanium activated hafnium dioxide phosphor host, characterized in that the monoclinic crystals consist essentially of oxygen and combined elements satisfying the relationship $$Hf_{1-z}Zr_zTi_xM_yIn_w$$

wherein
   M represents at least one alkali metal;
   w is in the range of from $1 \times 10^{-6}$ to $5 \times 10^{-3}$;
   x is in the range of from $3 \times 10^{-4}$ to 1.0;
   y is up to 1; and
   z is up to 0.3,
   the phosphor exhibiting reduced afterglow when excited by X-radiation as compared to the phosphor as defined above absent indium.

2. A screen comprised of
   a support and
   a fluorescent layer containing a phosphor capable of absorbing X-radiation and emitting longer wavelength electromagnetic radiation comprised of monoclinic crystals of a titanium activated hafnium dioxide phosphor host,
   characterized in that the monoclinic crystals consist essentially of oxygen and combined elements satisfying the relationship $$Hf_{1-z}Zr_zTi_xM_yIn_wNd_v$$

wherein
   M represents at least one alkali metal;
   v is in the range of $5 \times 10^{-8}$ to $5 \times 10^{-4}$;
   w is in the range of from $1 \times 10^{-6}$ to $5 \times 10^{-3}$;
   x is in the range of from $3 \times 10^{-4}$ to 1.0;
   y is up to 1; and
   z is up to 0.3, when excited by X-radiation the phosphor exhibiting reduced afterglow as compared to the phosphor defined above absent neodymium.

3. A screen according to claim 1 or 2 further characterized in that z is at least $4 \times 10^{-4}$.

4. A screen according to claim 3 further characterized in that z is in the range of from $1 \times 10^{-3}$ to 0.2.

5. A screen according to claim 4 further characterized in that z is in the range of from $2 \times 10^{-3}$ to 0.1.

6. A screen according to claim 1 or 2 further characterized in that x is in the range of from $3 \times 10^{-4}$ to 0.5.

7. A screen according to claim 1 or 2 further characterized in that x is in the range of from $3 \times 10^{-4}$ to 0.25.

8. A screen according to claim 1 or 2 further characterized in that y is at least $1 \times 10^{-4}$.

9. A screen according to claim 8 further characterized in that y is in the range of from $1 \times 10^{-4}$ to 0.2.

10. A screen according to claim 9 further characterized in that y is at least $8 \times 10^{-4}$ and the alkali metal ions include at least one of lithium, sodium, and potassium.

11. A screen according to claim 1 or 2 further characterized in that w is in the range of from $2 \times 10^{-6}$ to $1 \times 10^{-3}$.

12. A screen according to claim 2 further characterized in that v is in the range of from $2 \times 10^{-6}$ to $1 \times 10^{-5}$.

* * * * *